Figure 1:
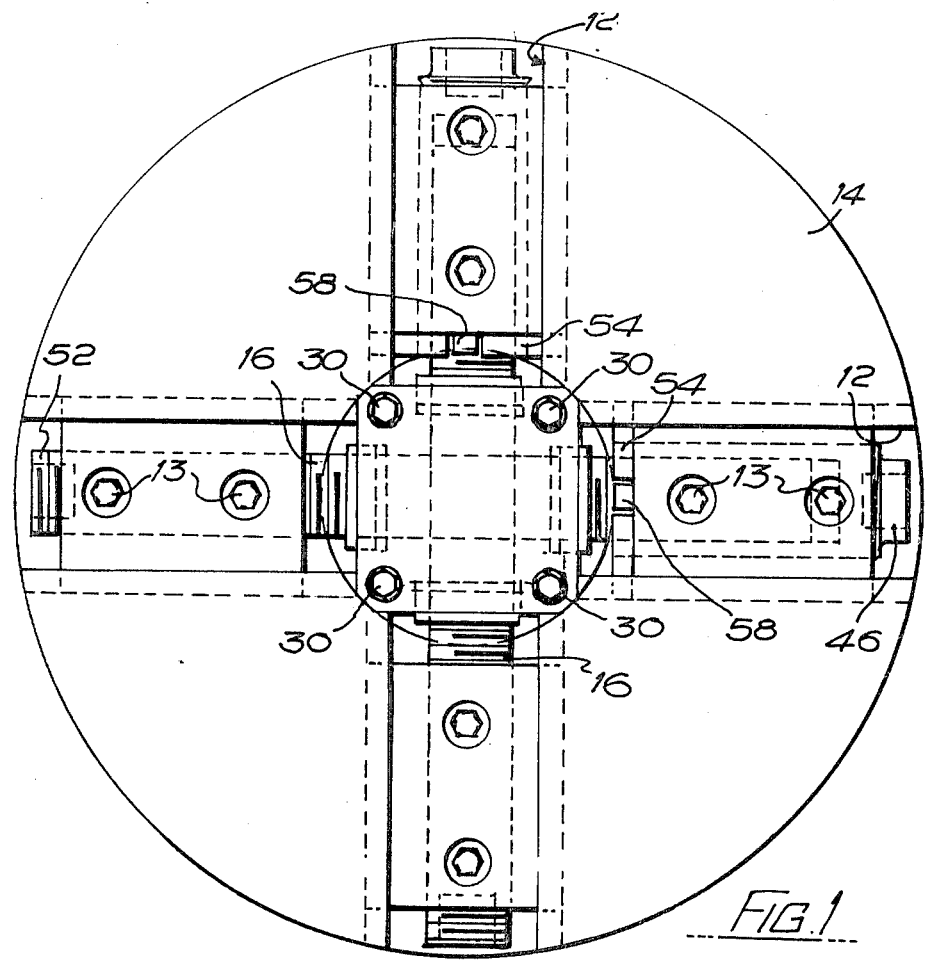

United States Patent [19]

Smith

[11] 4,192,521
[45] Mar. 11, 1980

[54] 4-JAW WORK HOLDING CHUCKS

[76] Inventor: Bernard Smith, 33 Bagshaw Ave., Chapel-en-le-Frith, Via Stockport, Cheshire, England

[21] Appl. No.: 836,080

[22] Filed: Sep. 23, 1977

[30] Foreign Application Priority Data

Oct. 2, 1976 [GB] United Kingdom ............... 41017/76
Oct. 7, 1976 [GB] United Kingdom ............... 41637/76

[51] Int. Cl.² ........................ B23B 31/36; B23B 31/12
[52] U.S. Cl. ..................................... 279/112; 279/67; 269/242
[58] Field of Search ............... 279/112, 110, 1 J, 1 L, 279/67; 269/172, 242

[56] References Cited

U.S. PATENT DOCUMENTS

| 2,366 | 11/1841 | Hogle | 279/112 |
| 518,136 | 4/1894 | Coons et al. | 279/112 |
| 1,008,926 | 11/1911 | Saylor | 269/242 X |
| 1,253,224 | 1/1918 | Fisher | 279/112 |
| 1,263,058 | 4/1918 | Griffith | 279/112 |
| 1,315,467 | 9/1919 | Church | 279/112 |
| 1,811,299 | 6/1931 | Brockhaus, Jr. | 269/242 |
| 2,245,384 | 6/1941 | Bullard | 279/112 |

Primary Examiner—Horace M. Culver

[57] ABSTRACT

A 4-jaw work holding chuck the jaws of which are adjustable in oppositely disposed pairs, each pair of jaws being adjustable towards or away from each other simultaneously by a respective one of a pair of adjusting screws.

9 Claims, 5 Drawing Figures

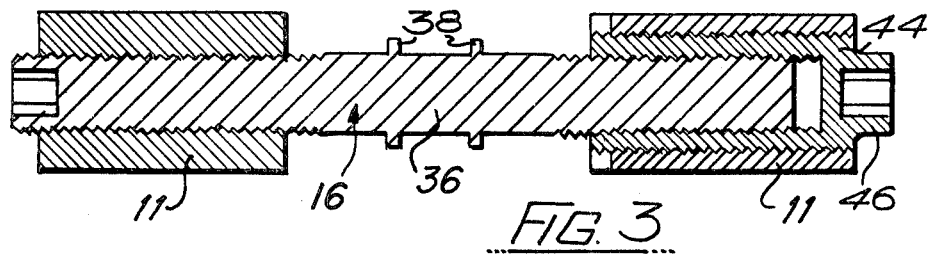
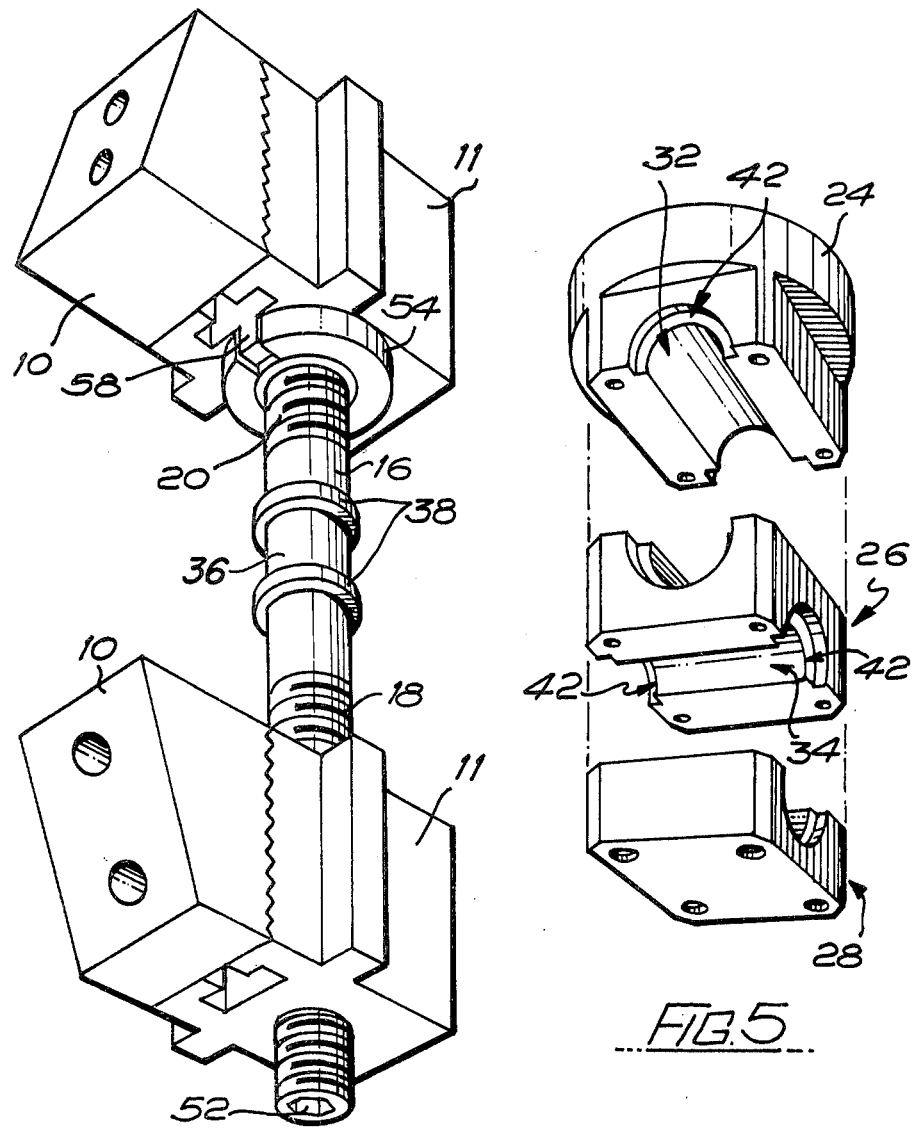

4-JAW WORK HOLDING CHUCKS

The invention relates to 4-jaw work holding chucks and has for its object to provide an improvement therein.

The jaws of a 4-jaw chuck are usually adjustable independently so that a workpiece which is to be machined can be located as required. For example, when a workpiece is to be machined from a cast or stamped blank a cylindrical part of the blank may need to be brought to a substantially co-axial position with the chuck although the chuck jaws are to engage a part of the blank which is of an irregular shape. This can be a time consuming operation and the invention aims to at least alleviate the problem, particularly when a batch of similar blanks are to be machined.

According to the invention, there is provided a 4-jaw work holding chuck the jaws of which are slidably disposed in radiating guides in a body of the chuck and which are adjustable in oppositely disposed pairs, each pair of jaws being adjustable towards or away from each other by a respective one of a pair of adjusting screws extending diametrically across the chuck body, each adjusting screw having a right hand thread at one end and a left hand thread at its other end. The adjusting screws will preferably be axially located, to extend in mutually perpendicular planes diametrically across the chuck body, by mounting means at the axis of said body, Such mounting means will preferably be constituted by a stack of three elements clamped together at the axis of the body, the two joint faces between the three elements bisecting respective bores which cross at minimum spacing in mutually perpendicular planes for receiving respective centre sections of the adjusting screws. Pairs of thrust collars will preferably be formed integrally on the adjusting screws and will flank the mounting means at the axis of the chuck body. Thrust washers, formed in halves so that they can be located on the centre sections of the adjusting screws, will preferably be provided between the thrust collars and counterbored abutment surfaces of the mounting means. Means will preferably be provided for effecting a differential adjustment of one of each pair of oppositely disposed jaws relative to the other, such means being operable independently of the adjusting screws so that they can be used either to effect a fine adjustment of a workpiece after it has been mounted in the chuck or to effect an initial displacement of one jaw relative to an oppositely disposed jaw to suit the irregular shape of a workpiece which is to be mounted in the chuck. Such means may be constituted by respective sleeves associated with the adjusting screws, each sleeve being located on one end of its adjusting screw and being internally screwthreaded for engaging the screwthread at that end of the screw and externally screwthreaded for engaging the jaw which is adjustable by that end of the screw. Each sleeve will preferably be provided at an outer end with a socket portion which can be engaged by a key so that said sleeve can be turned relative to the adjusting screw on which it is located. Respective braking devices will preferably be associated with the sleeves so that the latter are normally held against rotation whereby the jaws are normally adjustable in oppositely disposed pairs. Further braking devices may be associated with the adjusting screws so that the latter are held against rotation when differential adjustments are made. Each braking device may be constituted by a non-rotatable brake ring spring loaded or pre-stressed to be a grip fit on the sleeve or adjusting screw concerned.

Figure 2:
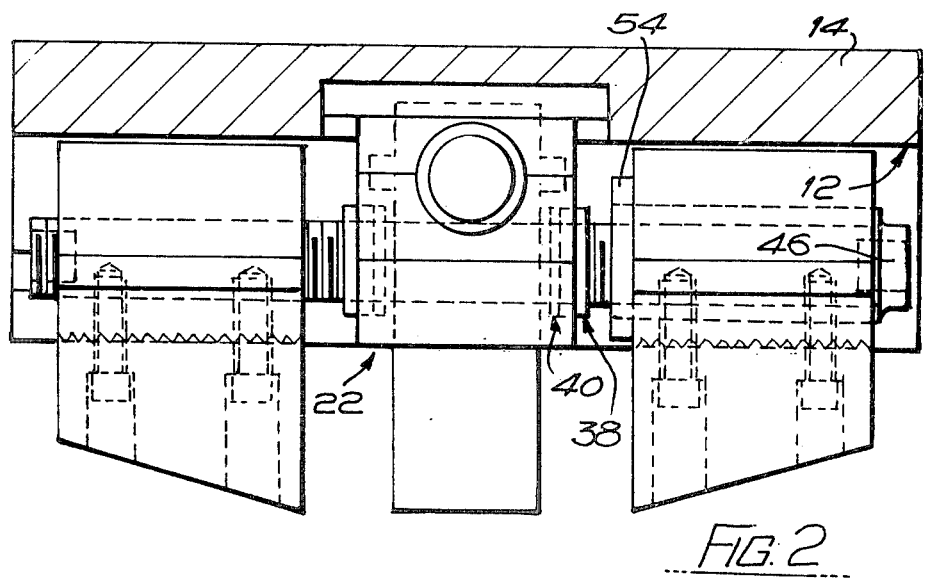

In order that the invention may be fully understood and readily carried into effect, the same will now be described, by way of example only, with reference to the accompanying drawings, of which:

FIG. 1 is a view on the face of a 4-jaw work holding chuck embodying the invention, FIG. 2 is an axial section on the line 2—2 in FIG. 1, FIG. 3 is a scrap longitudinal section through one of two adjusting screws and associated screwthreaded parts which will presently be referred to, FIG. 4 is a perspective view of the adjusting screw and associated parts shown in section in FIG. 3, and FIG. 5 is an exploded view of a part of the chuck which will presently be referred to.

Referring now to the drawings, the work holding chuck there illustrated has four jaws 10 carried by respective jaw blocks 11 which are slidably disposed in radiating guides 12 in a body 14 and which are adjustable in oppositely disposed pairs by adjusting screws 16.

The adjusting screws 16 extend diametrically across the chuck body and each screw has a right hand thread 18 at one end and a left hand thread 20 at its other end (the lead of each thread being the same) so that when the screw is rotated the pair of jaws which it controls are moved towards or away from each other with equal and opposite movement. The adjusting screws are axially located, to extend in mutually perpendicular planes diametrically across the chuck body, by mounting means generally indicated 22 at the axis of the chuck body. The mounting means 22 are constituted by a stack of three elements 24, 26 and 28 which are clamped together and to the chuck body by four bolts 30. As best seen in FIG. 5 the two joint faces between the three elements bisect respective bores 32 and 34 which cross at minimum spacing in mutually perpendicular planes for receiving respective centre sections 36 of the adjusting screws. Pairs of thrust collars 38 are formed integrally on the adjusting screws, as shown, and flank the mounting means 22 at the axis of the chuck body. Thrust washers 40 formed in halves so that they have been able to be located on the centre sections of the adjusting screws, are provided between the thrust collars 38 and counterbored abutment surfaces 42 of the mounting means.

Means are provided for effecting a differential adjustment of one of each pair of oppositely disposed jaws relative to the other. These means are constituted by a pair of sleeves 44 which are respectively associated with the adjusting screws, each sleeve being located on one end of its adjusting screw and being internally screwthreaded for engaging the screwthread at that end of the screw and externally screwthreaded for engaging the jaw block which is adjustable by that end of the screw. A socket portion 46 which is formed at an outer end of each sleeve is accessible at the periphery of the body of the chuck so that said sleeve can be turned, relative to the adjusting screw on which it is located, by means of an extraneous key (not shown). When the sleeve is turned in this way, the jaw with which it has screwthreaded engagement is adjusted in position, towards or away from the oppositely disposed jaw and independently of the latter. The key can also be engaged with a similar socket portion 52 at the other end of the adjusting screw so that the latter can be rotated to bring the pair of jaws which it controls towards or away from each other.

Respective braking devices are associated with the sleeves 44, each braking device being constituted by a non-rotatable brake ring 54 which is internally screwthreaded for engagement with the external screwthread formed on the sleeve with which it is associated. However, as shown in FIG. 4, each brake ring has been formed as a C-spring and is arranged to be a grip fit on the sleeve. The gap in the brake ring is engaged by a tongue portion 58 of the jaw block with which the sleeve has screwthreaded engagement. The arrangement is such that, since the screwthreaded adjusting screws can turn within the respective sleeves far more freely than the sleeves can turn within the associated jaw blocks, rotation of the adjusting screws normally affects the adjustment of the jaws in oppositely disposed pairs, each pair of jaws being displaced towards or away from each other to an equal and opposite extent as the adjustment takes place. However, when required, a differential adjustment of one of either pair of oppositely disposed jaws can be effected relative to the other by turning the appropriate sleeve referred to whilst holding the associated adjusting screw against rotation. Such a differential adjustment may be made to effect a fine adjustment of a workpiece after it has been mounted in the chuck or to effect an initial displacement of one jaw relative to an oppositely disposed jaw to suit the irregular shape of a workpiece which is to be mounted in the chuck (and it will be understood that if the workpiece is the first of a batch of similar workpieces, the mounting of subsequent workpieces in the chuck will be effected by turning only the adjusting screws 16 to effect the opening and closing of the jaws in oppositely disposed pairs).

Thus there is provided a 4-jaw work holding chuck which can be used by an operator of limited skill to mount and machine a batch of workpieces of irregular shape in a minimum of time. The chuck also ensures repeatedly correct positioning of components irrespective of variations in size since dimensional variations from one component to another are automatically shared out each side of the centre line of the chuck.

Various modifications may be made without departing from the scope of the invention. For example, in the accompanying drawings the jaws 10 are shown to have serrated surfaces engaging serrated surfaces of the jaw blocks 11 and the jaws are shown to be secured to said jaw blocks by means of Allen screws 13 (and in this way it will be seen that a coarse differnetial adjustment of the jaws could be effected by adjusting the position of one or more of the jaws on their jaw carriers and that the screw means described above for effecting such differential adjustment is not an essential pair of the invention). However, if preferred, the jaws could be connected to the jaw blocks by tenon-like interengagement. The means whereby the adjusting screws are mounted in the chuck body, and the braking devices by means of which the sleeves are normally held against rotation, may also be constructed differently than described and illustrated in the drawings. It may be found that further braking devices should be associated with the adjusting screws so that the latter are held against rotation when differential adjustments are to be made.

It has been found advantageous to make the chuck body of a composite construction, that is to say with a cast iron centre having machined jaw slots and with a steel support ring tightly encircling the cast iron centre. This has the advantage that the jaw slots in the cast iron centre have great wear resistance, and the further advantage that the steel support ring contains bursting forces produced by centrifugal forces and by heavy machining loads. The steel support ring may be mounted on a slow taper on the cast iron centre and in this way can be arranged to encircle the centre very tightly indeed to provide the strength required.

What I claim and desire to secure by Letters Patent is:

1. A 4-jaw work holding chuck, comprising a body provided with two pairs of oppositely disposed radiating guides, a jaw slidably adjustable along each said guides, a pair of adjusting screws extending diametrically across the body and threadedly connected to oppositely disposed pair of jaws, each adjusting screw having a right hand thread at one end and a left hand thread at its other end whereby, as the screw is turned, the oppositely disposed pair of jaws concerned are adjusted in position with equal and opposite movement, a sleeve located on at least one end of at least one of the adjusting screws between said screw and the associated jaw at said one end, said sleeve being internally screwthreaded for engaging the screwthread at that end of its associated screw and externally screwthreaded for engaging the associated jaw whereby rotation of said sleeve provides a differential adjustment of its associated jaw relative to the opposite jaw independent of said adjusting screw.

2. In a 4-jaw work holding chuck according to claim 1, mounting means at the axis of the body for axially locating the adjusting screws.

3. In a 4-jaw work holding chuck according to claim 2, the mounting means for the adjusting screws being constituted by a stack of three elements clamped together at the axis of the body, the two joint faces between the three elements bisecting respective bores which cross at minimum spacing in mutually perpendicular planes for receiving respective centre sections of the adjusting screws.

4. In a 4-jaw work holding chuck according to claim 3, pairs of thrust collars being formed integrally on the adjusting screws and flanking the adjusting screw mounting means at the axis of the chuck body.

5. In a 4-jaw work holding chuck according to claim 4, including thrust washers formed in halves and located between the thrust collars and counterbored abutment surfaces formed in the mounting means.

6. In a 4-jaw work holding chuck according to claim 1 each sleeve being provided at an outer end with a socket portion for engagement by a key so that said sleeve can be turned relative to the adjusting screw on which it is located.

7. In a 4-jaw work holding chuck according to claim 1, respective braking devices being associated with the sleeves for holding the sleeves against rotation whereby the jaws are normally adjustable in oppositely disposed pairs.

8. In a 4-jaws work holding chuck, according to claim 7, said braking chuck comprises a ring arranged on said adjusting screw in association with said sleeve, said ring and the associated jaw having cooperating means interengaging to selectively prevent rotation of said ring about said adjusting screw and thereby prevent movement of said sleeve along said adjusting screw.

9. In a 4-jaw work holding chuck according to claim 3, said mounting means comprising a series of three elements clampable together within the chuck body at the axis thereof, a first of said elements being interposed between second and third of said elements, said first element having a segment of each of said bores formed in the opposed faces thereof and said second and third elements defining in respective faces thereof the remaining portions of said bores such that in cooperation with said first element the elements when assembled define said bores.

* * * * *